April 22, 1941.    B. MARQUIS    2,239,492

METHOD OF RECOVERING PIGMENT

Filed Nov. 21, 1938

INVENTOR
BYRON MARQUIS
BY Milton Zucker
ATTORNEY

Patented Apr. 22, 1941

2,239,492

UNITED STATES PATENT OFFICE 2,239,492

METHOD OF RECOVERING PIGMENT

Byron Marquis, Westfield, N. J., assignor to Interchemical Corporation, New York, N. Y., a corporation of Ohio Application November 21, 1938, Serial No. 241,716

3 Claims. (Cl. 134—58)

This invention relates to the separation of pigments from association with liquids, and has particular reference to a new and novel method of preparing pigments of fine particle size.

In the preparation of pigments such as lithopone and the like, it is often desirable to obtain a very fine product, with a uniform particle size of the order of 10 microns or less in diameter. Wet slurries of pigment of this particle size can ordinarily, and most economically, be obtained by fine wet grinding and wet classification to the desired particle size. However, on filtering such pigments, and then drying them, it is found that the desired uniform small particle size is never obtained, apparently due to the cementing action between particles during the drying operation.

I have discovered that dry pigments of uniformly fine texture can be obtained from a water slurry, by subjecting the slurry to centrifugal action, forcing the pigment into a water immiscible liquid heavier than water (such as carbon tetrachloride or trichloroethylene). In this process, the wet pigment particles, as they hit the organic liquid, are simultaneously forced into the liquid by centrifugal force, and dried by the filtering action of the liquid on the water. The pigment particles do not cement to each other when the organic vehicle is removed by heat, leaving a powder with the uniform fine particle size of the original wet pigment.

Figure 1:
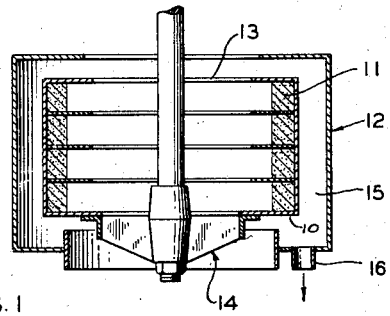
Figure 2:
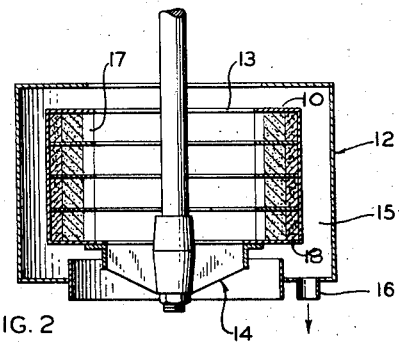
Figure 3:
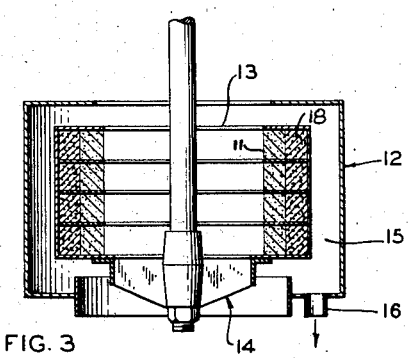

The invention can be best understood by referring to the accompanying drawing, in which Figs. 1, 2 and 3 show three stages of my process.

In Fig. 1, the heavy liquid 11 is shown being fed into the rotating bowl 10 of a conventional centrifuge 12 comprising the rotating bowl provided with an inlet and overflow opening 13, a dump opening 14, and an overflow chamber 15, in which is an overflow discharge pipe 16. The operation shown in Fig. 1 is continued until a substantial film of solvent is built up on the periphery of the bowl.

The operation shown in Fig. 2 is then commenced. A mixture of water 17 and pigment 18 is fed into the bowl. On striking the film of heavy liquid, the water, which is immiscible and lighter, is kept to the center of the bowl, while the heavier pigment passes through the liquid to the outside edge of the bowl. The water overflows into the chamber 15 and the overflow pipe 16 continuously.

When the organic solvent reaches the overflow, as shown in Fig. 3, the operation is complete, the centrifuge is stopped, and the pigment and solvent are discharged into the dump opening. Since the organic solvent flows while the pigment does not, the bulk of the separation occurs at once. The solvent may be filtered, but is preferably returned to the centrifuge to start another cycle without filtration. The pigment is very readily dried of the small amount of solvent remaining in it.

Any organic liquid may be used which is immiscible with and heavier than water, which is non-reactive with and lighter than the pigment used, and which may be removed from the pigment without causing cementing. Carbon tetrachloride and trichloroethylene are particularly desirable.

The pigment must obviously be sufficiently heavier than the water so that it will centrifuge out of it. Practically all pigments may be dried by my method except certain light organic toners. In addition, care must be taken with certain organic colors that they are insoluble in the solvents. I have successfully dried lithopone, zinc sulfide, chrome yellow, titanium and many other pigments, in every case obtaining a desirable non-agglomerated structure.

My process can also be used for removing pigment from suspensions in organic liquids which have a cementing action on the pigment. For example, in analyzing a paint, where a clean separation of pigment and oil is desired, the paint may be reduced to very thin consistency with light petroleum naphtha, and centrifuged, using distilled water as the heavy filtering liquid, to get a clean separation of the pigment from the paint vehicle.

I claim:

1. The method of drying a water wet pigment powder which comprises feeding sufficient water immiscible volatile organic liquid heavier than water and having no cementing action on the powder into the bowl of a running centrifuge to form a layer therein, feeding a water pigment slurry into the bowl, whereby the pigment passes through said layer and the water overflows, continuing the operation until the bowl is full of pigment and organic liquid, then removing the organic liquid and pigment from the bowl and separating the organic liquid and the pigment.

2. The method of obtaining a pigment of uniformly fine particle size, which comprises milling the pigment, wet classifying to the desired particle size, subjecting the classified slurry to centrifugal action through a layer of water immiscible volatile organic liquid heavier than water and having no cementing action on the pigment, separating the water from the organic liquid and pigment, and recovering the pigment from its mixture with organic liquid.

3. The method of obtaining a pigment of fine particle size from an aqueous slurry of the pigment of the desired particle size, which comprises subjecting the aqueous slurry to centrifugal action through a layer of water-immiscible organic liquid heavier than water and having no cementing action on the pigment, thereby separating the water from the organic liquid and pigment, and recovering the pigment from its mixture with the organic liquid.

BYRON MARQUIS.